(12) United States Patent
Bartik et al.

(10) Patent No.: US 9,710,184 B2
(45) Date of Patent: *Jul. 18, 2017

(54) SERVICING MULTIPLE COUNTERS BASED ON A SINGLE ACCESS CHECK

(71) Applicant: International Business Machines Corporation, Armonk, NY (US)

(72) Inventors: Jane H. Bartik, Poughkeepsie, NY (US); Jonathan D. Bradbury, Poughkeepsie, NY (US); Daniel V. Rosa, Highland, NY (US); Donald W. Schmidt, Stone Ridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/825,989

(22) Filed: Aug. 13, 2015

(65) Prior Publication Data

US 2016/0098202 A1    Apr. 7, 2016

Related U.S. Application Data

(63) Continuation of application No. 14/506,099, filed on Oct. 3, 2014.

(51) Int. Cl.
*G06F 3/00* (2006.01)
*G06F 12/00* (2006.01)
*G06F 3/06* (2006.01)
*G06F 9/30* (2006.01)
*G06F 11/30* (2006.01)

(52) U.S. Cl.
CPC ............ *G06F 3/064* (2013.01); *G06F 3/0604* (2013.01); *G06F 3/0622* (2013.01); *G06F 3/0673* (2013.01); *G06F 9/30003* (2013.01); *G06F 9/3004* (2013.01); *G06F 9/3013* (2013.01); *G06F 11/30* (2013.01)

(58) Field of Classification Search
CPC ......................... G06F 2201/88; G06F 11/3644
See application file for complete search history.

(56) References Cited

U.S. PATENT DOCUMENTS 7,792,027 B2 *   9/2010   Tatar ................... H04L 49/1546
                                                          370/230
7,889,750 B1 *   2/2011   Parker .................... H04L 47/10
                                                          370/389

(Continued)

OTHER PUBLICATIONS

List of IBM Patents or Patent Applications Treated as Related; Date Filed: Aug. 13, 2015, 2 pages.

*Primary Examiner* — Hyun Nam
(74) *Attorney, Agent, or Firm* — Cantor Colburn LLP; William A. Kinnaman, Jr.

(57) ABSTRACT

A system and method for implementing a servicing instruction for a plurality of counters that includes determining a counter set based on the servicing instruction, whether access is authorized to the counter set, and a block of storage in a memory based on the service instruction. In response to the determining that the access is authorized, the system and method extracts the plurality of counters within the counter set in response to the determining that the access is authorized and storing the plurality of counters in the block of storage.

6 Claims, 6 Drawing Sheets

(56) References Cited

U.S. PATENT DOCUMENTS

| | | | | |
|---|---|---|---|---|
| 2006/0203722 A1* | 9/2006 | Oommen | ............... | H04L 41/50 |
| | | | | 370/229 |
| 2012/0023300 A1* | 1/2012 | Tremaine | ............ | G06F 12/1009 |
| | | | | 711/162 |
| 2016/0098273 A1* | 4/2016 | Bartik | ................. | G06F 9/30003 |
| | | | | 712/228 |

* cited by examiner

Diagram 400

STCCTM R₁,M₃,D₂(B₁)                                         [RSY-b]

| 'EB' | R₁ | M₃ | B₂ | DL₂ | DH₂ | '17' |
|------|----|----|----|-----|-----|------|
| 0    | 8  | 12 | 16 | 20  | 42  | 40  47 |

Figure 4

SERVICING MULTIPLE COUNTERS BASED ON A SINGLE ACCESS CHECK

DOMESTIC PRIORITY

This application is a continuation of U.S. application Ser. No. 14/506,099, filed on Oct. 3, 2014, the disclosure of which is incorporated by reference herein in its entirety.

BACKGROUND

The disclosure relates generally to servicing multiple counters based on a single access check, and more specifically, to an instruction to save all counters within a counter set via one check of access controls respective to that counter set to enable efficient servicing of the counters.

As computer systems increase in complexity the number of hardware instrumentation counters has increased to gain insight into the hardware performance. Operating systems serving client applications using the hardware collect these instrumentation counters to gain insight into how the workload performs. These instrumentation counters are often grouped together into sets of counters that collect information on a common subsystem. Each set of counters includes associated activation and authorization controls. Currently, when the instrumentation counters are serviced, only one counter is extracted at a time. Thus, for each counter in the counter set, an access check must be performed for that counter, which results in additional overhead processing.

SUMMARY

According to one embodiment of the present invention, a method of implementing a servicing instruction for a plurality of counters that comprises determining a counter set based on the servicing instruction; determining whether access is authorized to the counter set; determining a block of storage in a memory based on the service instruction and in response to the determining that the access is authorized; extracting the plurality of counters within the counter set in response to the determining that the access is authorized; and storing the plurality of counters in the block of storage.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 4 illustrates a diagram of a servicing instruction; and

DETAILED DESCRIPTION

As indicated above, current tracking and extracting methods of counters provides additional overhead for operating systems. Thus, what is needed is an instruction to save all counters within a counter set with only one check of access controls respective to that counter set to enable efficient servicing of the counters.

In general, embodiments of the present invention disclosed herein may include a servicing system, method, and/or computer program product ("servicing system") that executes an instruction for a servicing of a plurality of counters via a group extraction to storage. For instance, each of the plurality of counters is associated with a plurality of authorization or access controls. Further, some counters may be associated with an overlapping set of authorization controls (and thus are grouped in a counter set). In turn, based on the instruction, the servicing system selects a counter set and validates or checks the authorization controls for that counter set. Once the servicing system confirms the authorization controls, the servicing system extracts as a group a specified number of counters associated with that counter set from the plurality of counters, and stores the counter group in a block of storage. In this way, the servicing system increases the efficiency of servicing the plurality of counters in that the authorization controls of each counter is not individually processed and therefore not individually consuming processing resources.

Figure 1:
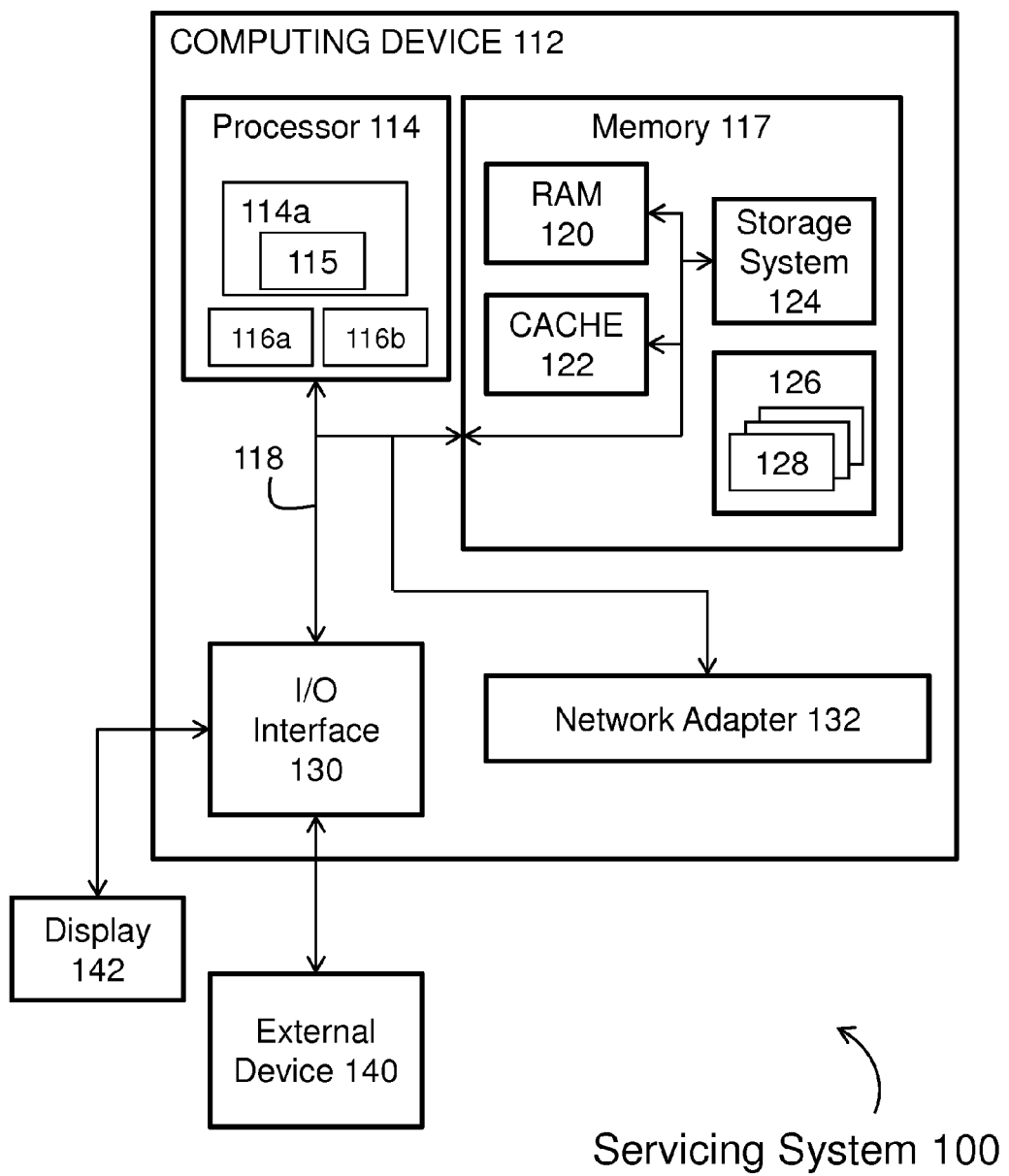
FIG. 1 illustrates a computing device schematic of a servicing system.

Referring now to FIG. 1, an example of a servicing system 100 including a computing device 112 is shown. The servicing system 100 is only one example of a suitable computing node and is not intended to suggest any limitation as to the scope of use or operability of embodiments of the invention described herein (indeed additional or alternative components and/or implementations may be used). That is, the servicing system 100 and elements therein may take many different forms and include multiple and/or alternate components and facilities. Further, the servicing system 100 may include and/or employ any number and combination of computing devices and networks utilizing various communication technologies, as described herein. Regardless, the servicing system 100 is capable of being implemented and/or performing any of the operability set forth herein.

In the servicing system 100 there is a computing device 112, which is operational with numerous other general purpose or special purpose computing system environments or configurations. Systems and/or computing devices, such as the servicing system 100 and/or the computing device 112, may employ any of a number of computer operating systems, including, but by no means limited to, versions and/or varieties of the AIX UNIX and z/OS operating systems distributed by International Business Machines Corporation of Armonk, N.Y., the Microsoft Windows operating system, the Unix operating system (e.g., the Solaris operating system distributed by Oracle Corporation of Redwood Shores, Calif.), the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing systems, environments, and/or configurations that may be suitable for use with the computing device 112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, computer workstations, servers, desktops, notebooks, network devices, mainframe computer systems, and distributed cloud computing environments that include any of the above systems or devices, and the like.

The computing device 112 may be described in the general context of computer system executable instructions, such as program modules, being executed by a computer system. Generally, program modules may include routines, programs, objects, components, logic, data structures, and so on that perform particular tasks or implement particular abstract data types. The computing device 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computing device 112 in the servicing system 100 is shown in the form of a general-purpose computing device that is improved upon based on the operation and functionality of the servicing system 100, its methods, and/or elements thereof. The components of the computing device 112 may include, but are not limited to, one or more processors or processing units (e.g., processor 114 that includes at least one core 114a that supports a plurality of threads 115; e.g., a servicing system 100 includes a core 114a of a processor 114 comprising two or more threads 115; e.g., the processor 114 includes counters split into counter sets 116a and authorization controls 116b), a memory 117, and a bus 118 that couples various system components including the processor 114 and the memory 117. The computing device 112 also typically includes a variety of computer system readable media. Such media may be any available media that is accessible by the computing device 112, and it includes both volatile and non-volatile media, removable and non-removable media.

The processor 114 may receive computer readable program instructions from the memory 117 and execute these instructions, thereby performing one or more processes defined by the servicing system 100. The processor 114 may include any processing hardware, software, or combination of hardware and software utilized by the computing device 114 that carries out the computer readable program instructions by performing arithmetical, logical, and/or input/output operations. Examples of the processor 114 and core 114a hardware sub-units include, but are not limited to an arithmetic logic unit, which performs arithmetic and logical operations; a control unit, which extracts, decodes, and executes instructions from a memory.

Figure 2A:
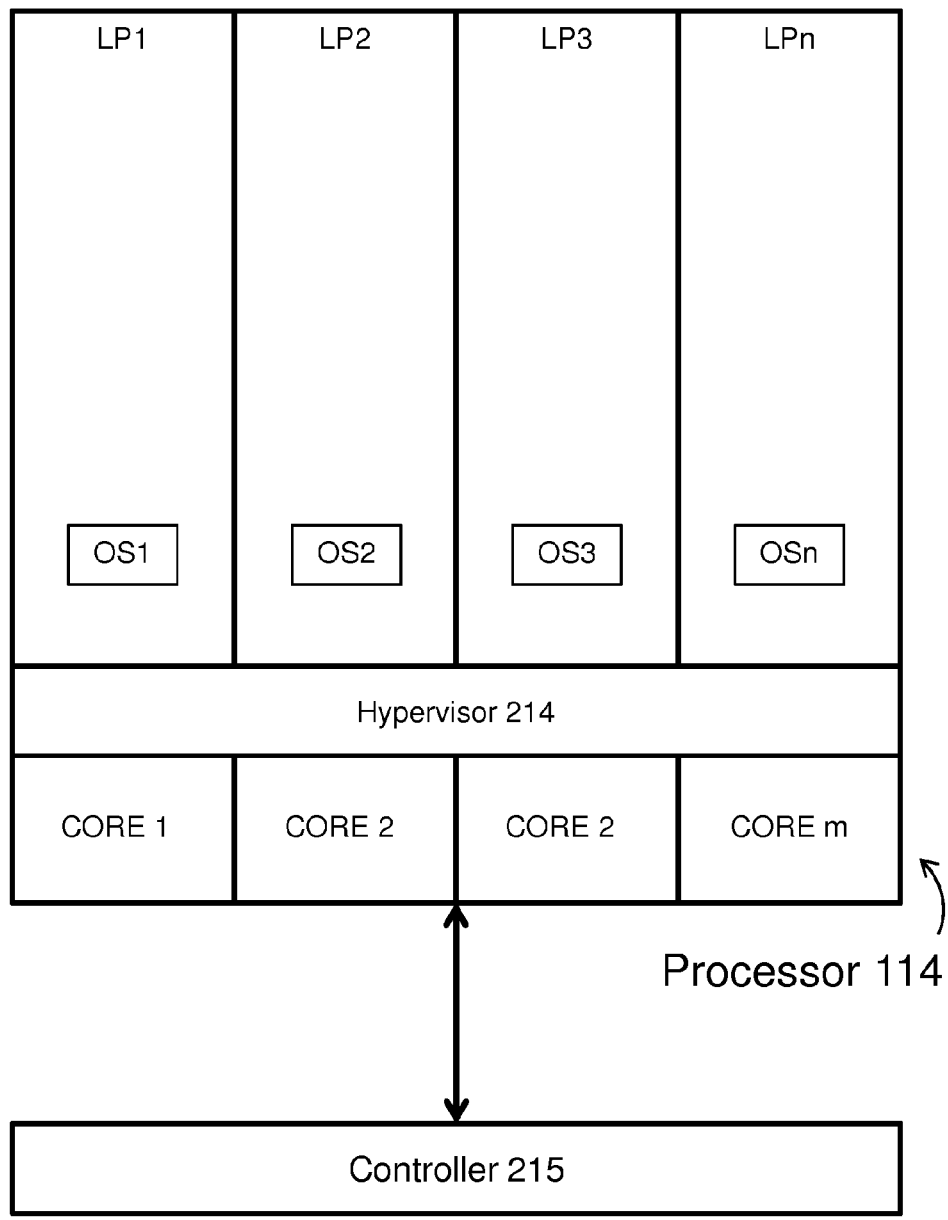
FIG. 2A-B further illustrate components of a computing device schematic of a servicing system.

FIG. 2A illustrates an embodiment of a computing environment that includes the processor 114 coupled to a controller 215. In one example, a computing environment based on the z/Architecture includes a System z server, offered by International Business Machines Corporation, Armonk, N.Y. The computing device 112 can include, for example, one or more physical cores (e.g., Core 1-Core m), running a level-0 hypervisor 214 (e.g., a logical partition manager) which manages one or more partitions (e.g., logical partitions LP1-LPn). The controller 215 can include centralized logic responsible for arbitrating between different core requests. For instance, when the controller 215 receives a memory access request, it determines if access to that memory location is allowed and, if so, provides the contents of that memory location to the processor 114 while maintaining memory consistency between processors within that complex. Another controller 215 may manage the requests to and from the I/O interface 130 and network adapter 132, shown in FIG. 1.

Physical cores are allocated to the logical partitions. A logical partition can include one or more logical processors, each of which represents all or a share of the physical processor resources allocated to the partition. The physical cores may be either dedicated to the logical cores of a particular partition, so that physical processor resources of the underlying core(s) are reserved for that partition; or shared with the logical cores of another partition, so that physical processor resources of the underlying core(s) resources are potentially available to another partition. Each logical partition can be capable of functioning as a separate system. That is, each logical partition can be independently reset, initially loaded with an operating system (e.g., operating system OS1-OSn), if desired, and operate with different programs. An operating system or application program running in a logical partition can appear to have access to a full and complete system, but in reality, only a portion of the entire system is available. A combination of hardware and Licensed Internal Code (also referred to as firmware, microcode, or millicode) keeps a program in one logical partition from accessing or interfering with a program in a different logical partition. This allows several different logical partitions to operate on a single or multiple physical cores in a time sliced manner. In an embodiment, each physical core includes one or more central processors (also referred to herein as "physical threads"). In the example shown in FIG. 2A, each logical partition has a resident operating system, which may differ for one or more logical partitions. Each logical partition is an example of a virtual machine or guest configuration, in which an operating system is capable of running.

In the embodiment shown in FIG. 2A, the logical partitions LP1-LPn are managed by level-0 hypervisor 214 which is implemented by firmware running on physical cores Core1-Core m. Logical partitions LP1-LPn and hypervisor 214 each comprise one or more programs residing in respective portions of central storage (memory) associated with the physical cores Core1-Core m. One example of hypervisor 214 is the Processor Resource/Systems Manager (PR/SM™), offered by International Business Machines Corporation, Armonk, N.Y.

Figure 2B:
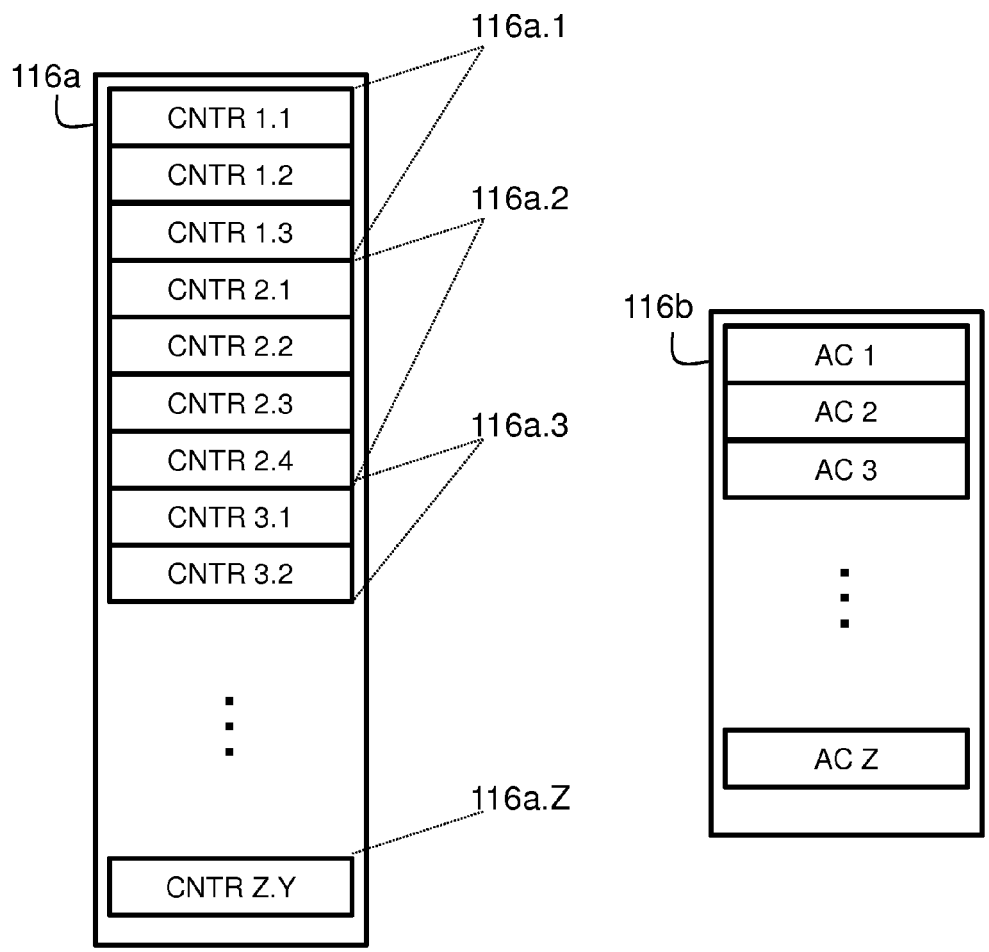

FIG. 2B illustrates an embodiment of a plurality of counter sets 116a and a corresponding plurality of authorization controls 116b, wherein each counter (e.g., CNTR 1.1, CNTR 1.2, CNTR 1.3, CNTR 2.1, CNTR 2.2, CNTR 2.3, CNTR 2.4, CNTR 3.1, CNTR 3.2, and CNTR Z.Y) is associated an authorization control (e.g., AC 1, AC 2, AC 3, and AC Z). In turn, based on the instruction, the servicing system 100 selects a counter set 116a.1, 116a.2, 116a.3, etc. and validates or checks the corresponding authorization control AC 1, AC 2, AC 3, etc. A counter can be a binary program counter that may be one of many registers in the processor 114 hardware. Further, the counter may be a bank of binary latches, each one representing one bit of the value of the counter, where the number of bits (the width of the counter) relates to the processor architecture. If the counter is a binary counter, it may increment when a pulse is applied to its COUNT UP input.

Returning to FIG. 1, the memory 117 may include a tangible device that retains and stores computer readable program instructions, as provided by the servicing system 100, for use by the processor 114 of the computing device 112. The memory 117 can include computer system readable media in the form of volatile memory, such as random access memory (RAM) 120, cache memory 122, and/or the storage system 124. The bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

By way of example only, the storage system 124 can be provided for reading from and writing to non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 118 by one or more data media interfaces. As will be further depicted and described below, the memory 117 may include at least one program product having a set (e.g., at least one) of program modules that are configured to carry out the operations of embodiments of the invention. The storage system 124 (and/or memory 117) may include a database, data repository or other data store and may include various kinds of mechanisms for storing, accessing, and retrieving various kinds of data, including a hierarchical database, a set of files in a file system, an application database in a proprietary format, a relational database management system (RDBMS), etc. The storage system 124 may generally be included within the computing device 112, as illustrated, employing a computer operating system such as one of those mentioned above, and is accessed via a network in any one or more of a variety of manners.

A program/utility 126, having a set (at least one) of program modules 128, may be stored in memory 117 by way of example, and not limitation, as well as an operating system, one or more application programs, other program modules, and program data. Each of the operating system, one or more application programs, other program modules, and program data or some combination thereof, may include an implementation of a networking environment.

The computing device 112 may also communicate via an input/output (I/O) interface 130 and/or via a network adapter 132. The I/O interface 130 and/or the network adapter 132 may include a physical and/or virtual mechanism utilized by the computing device 112 to communicate between elements internal and/or external to the computing device 112. For example, the I/O interface 130 may communicate with one or more external devices 140, such as a keyboard, a pointing device, a display 140, etc.; one or more devices that enable a user to interact with the computing device 112; and/or any devices (e.g., network card, modem, etc.) that enable the computing device 112 to communicate with one or more other computing devices. Further, the computing device 112 can communicate with one or more networks such as a local area network (LAN), a general wide area network (WAN), and/or a public network (e.g., the Internet) via network adapter 132. Thus, I/O interface 130 and/or the network adapter 132 may be configured to receive or send signals or data within or for the computing device 112. As depicted, the I/O interfaces 130 and the network adapter 132 communicate with the other components of the computing device 112 via the bus 118. It should be understood that although not shown, other hardware and/or software components could be used in conjunction with the computing device 112. Examples, include, but are not limited to: microcode, device drivers, redundant processing units, external disk drive arrays, RAID systems, tape drives, and data archival storage systems, etc.

While single items are illustrated for the servicing system 100 (and other items) by FIG. 1, these representations are not intended to be limiting and thus, any items may represent a plurality of items. For example, the processor 114 may include a plurality of counters, each of which is serviced based on the servicing instruction described herein.

Figure 3:
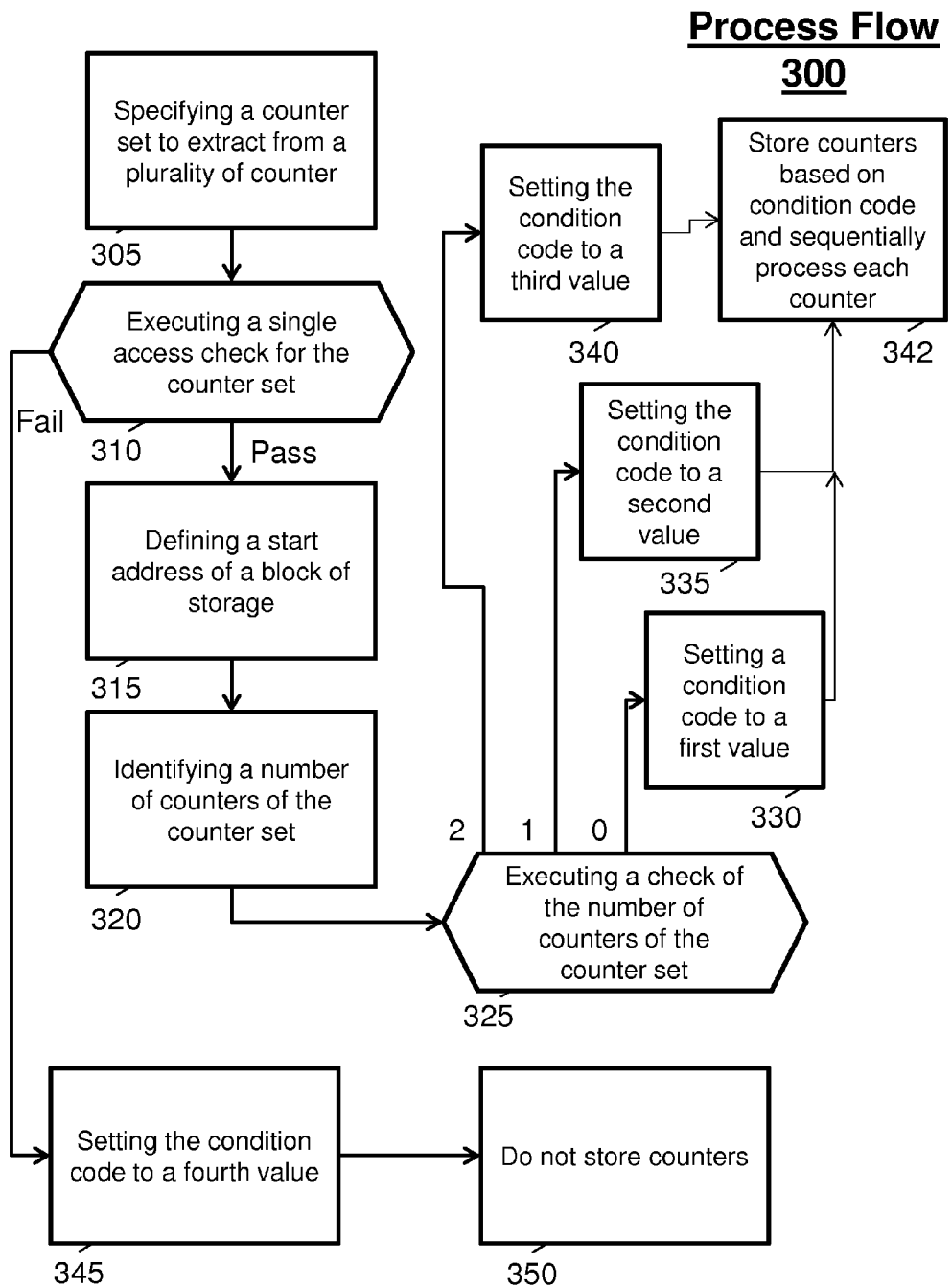
FIG. 3 illustrates a process flow by a servicing system.

Thus, in view of the above, an embodiment of an instruction by the servicing system 100 will be described with reference to FIG. 3, which illustrates a process flow 300 to save all of the counters within a counter set to block storage with only one validation or check of access controls corresponding to that counter set. Note that the parameters of the instruction ("servicing instruction") include a number of counters from that counter set to store (e.g., first operand), a memory address (e.g., second operand), and a counter set (e.g., third operand). Note that, in general, the contents of a range of counters specified by the first and third operands are stored to the address specified by the second operand. To assist with the description of the process flow 300, an embodiment of the servicing instruction will be described with reference to FIG. 4, which illustrates a diagram 400. The diagram 400 is one example of a layout of the servicing instruction in memory (e.g., bits 0 through 47), where an 'EB' field is the operation code that specifies or identifies the instruction, an R_1 field is the first operand, an M_3 is the third operand, B_2, DH_2, and DL_2 fields combine to form the second operand, and a '17' field which specifies an operation code extension which along with the operation code specifies or identifies the instruction.

Returning to FIG. 3, when the servicing system 100 receives the servicing instruction (e.g., as identified by the 'EB' and '17' fields), the process flow 300 will begin at start block 305 where the servicing system 100 reads the counter set to extract from a plurality of counters from the servicing instruction. As illustrated in FIG. 4, the M_3 field is an encoded field that specifies what counter set to extract from the plurality of counters. That is, the M_3 field specifies a code used to indicate the counter set to be stored, and if the M_3 field specifies a reserved value, a specification exception may be recognized. For example, the M_3 field may specify a counter set as follows: '0' is an extended counter set; '1' is a basic counter set, '2' is a problem-state counter set; etc. Each counter set has its own authorization. Thus, based on which counter set the M_3 field specifies, a particular authorization will be checked.

Next, at determination block 310, the servicing system 100 executes a single access check for the counter set that was specified in block 305. For example, based on the specified counter set 116a.1, 116a.2, 116a.3, etc., the servicing system 100 validates or checks the corresponding authorization control AC 1, AC 2, AC 3, etc. If the access checks pass, the process flow 300 proceeds (e.g., as illustrated by the 'Pass' arrow) to block 315, where the servicing system 100 defines a start address of a block of storage in which to do the extraction based on the memory address of the servicing instruction. As illustrated in FIG. 4, the second operand is an address of the block of memory in which the servicing system 100 will be storing the counters. The second operand is based on the contents of bits 20 through 39 (e.g., a twenty bit value from DL_2 and DH_2 fields) and the contents of a register specified by bits 16 through 19 (e.g., B_2 field). For instance, a bit value of the DH_2 field is concatenated by a bit value of the DL_2 field to create a 20 bit signed number that is added to a bit value in a register specified by the B_2 field to compute the address.

Then, at block 320, a number of counters of the counter set is identified by servicing system 100. In this case, the number of counters in the counter set must be ascertained so that the servicing system 100 may compare the number of counters capable of being held in the block storage with the number of counters in the counter set if the counter set is authorized.

Further, the process flow 300 proceeds to decision block 325 where a number of counters of the counter set as defined by the servicing instruction is checked with respect to the number of counters in the counter set. As indicated, the first operand is a general purpose register that specifies the number of counters to store (e.g., the value in the register specified by bits 8 through 11 of R_1 field of FIG. 4). Thus, the first operand is the number of counters being requested and is compared to what the servicing system 100 knows as the number of counters in the counter set.

If the number of counters requested equals the number of counters in the counter set, then a condition code is set to a first value, such as zero, and all counters in the counter set are stored by the servicing system 100 (e.g., as illustrated by the '0' arrow, block 330, and block 342). For example, as illustrated in FIG. 2B, if the counter set 116*a*.1 is specified and the number of counters requested is three, then because the counter set 116*a*.1 includes three counters CNTR 1.1, CNTR 1.2, CNTR 1.3 that equals the number of counters requested, the condition code is set to zero. A condition code can be a value outputted the servicing system 100, e.g., in a hardware embodiment; however, it may be used interchangeably with a return code of an emulator embodiment as further described below.

If the number of counters requested is less than the number of counters in the counter set, then a condition code is set to a second value, such as one, and a subset of the counters in the counter set are stored by the servicing system 100 (e.g., as illustrated by the '1' arrow, block 335, and block 342). For example, as illustrated in FIG. 2B, if the counter set 116*a*.2 is specified and the number of counters requested is three, then because the counter set 116*a*.2 includes four counters CNTR 2.1, CNTR 2.2, CNTR 2.3, CNTR 2.4 that is greater than the number of counters requested, the condition code is set to one.

If the number of counters requested is greater than the number of counters in the counter set, then a condition code is set to a third value, such as two, and all of the counters in the counter set are stored by the servicing system 100 (e.g., as illustrated by the '2' arrow, block 340, and block 342). For example, as illustrated in FIG. 2B, if the counter set 116*a*.3 is specified and the number of counters requested is three, then because the counter set 116*a*.3 includes two counters CNTR 3.1, CNTR 3.2 that is less than the number of counters requested, the condition code is set to two.

Returning to block 310, if the access checks do not pass then a condition code is set to a fourth value, such as three, and the counter set is not block-stored by the servicing system 100 (e.g., as illustrated by the 'Fail' arrow, block 345, and block 350). Note that when the condition code is the fourth value, either the servicing system 100 does not have authorization to the counter set or the number of counters in the counter set as defined by the service instruction is zero.

Figure 5:
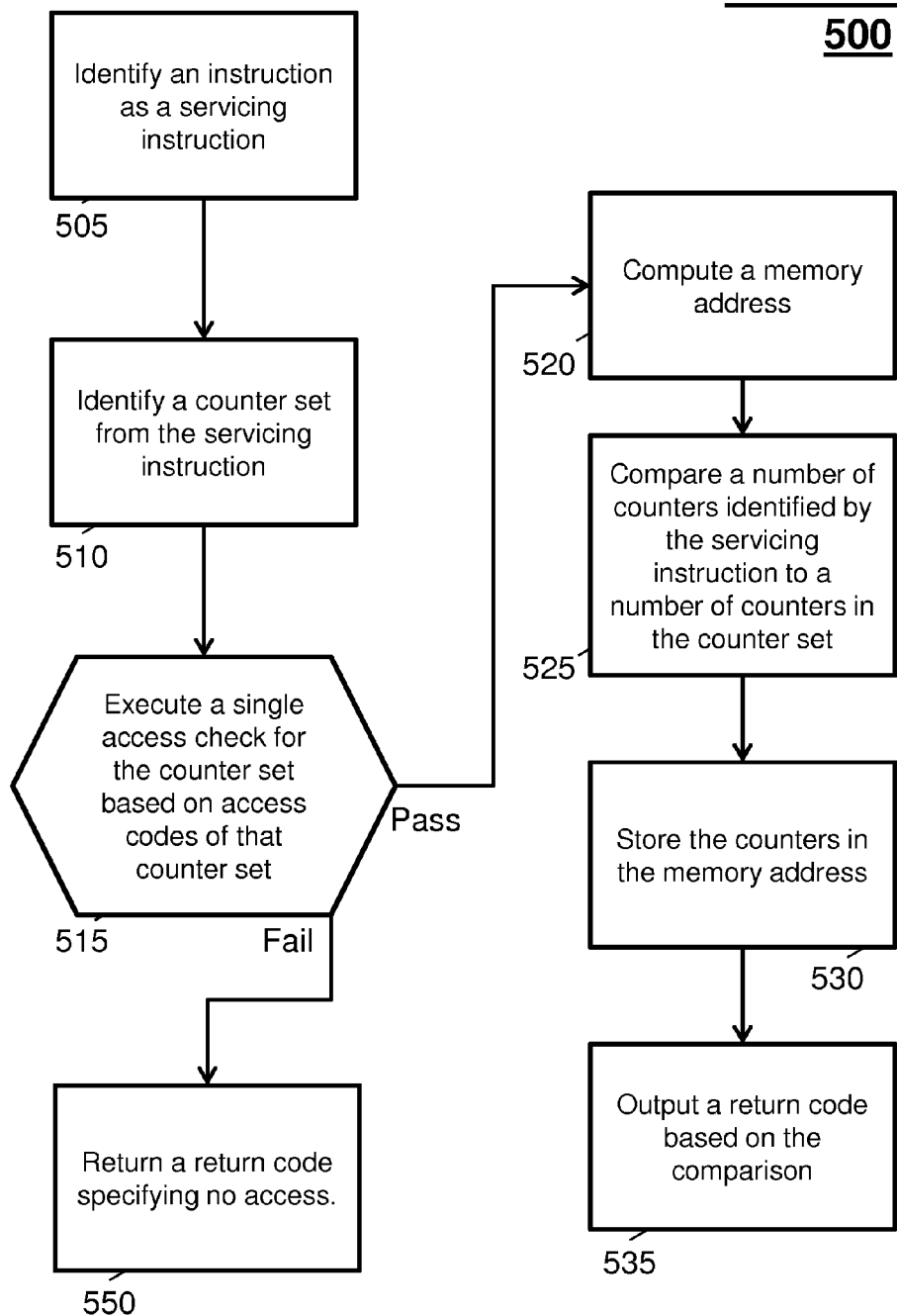
FIG. 5 illustrates another process flow by a servicing system.

Another embodiment of the servicing instruction by the servicing system 100 will be described with reference to FIG. 5, which illustrates a process flow 500. The process flow 500 begins at start block 505 where the servicing system 100 identifies an instruction as a servicing instruction (e.g., as identified by the 'EB' and '17' fields of FIG. 4). Next, in block 510, the servicing system 100 identifies a counter set from the servicing instruction (e.g., as identified by the M_3 field of FIG. 4). Then, at block 515, the servicing system 100 executes a single access check for the counter set that was specified in block 505.

If the access checks pass, the process flow 500 proceeds (e.g., as illustrated by the 'Pass' arrow) to block 520, where the servicing system 100 computes a memory address as defined by the servicing instruction (e.g., a bit value of the DH_2 field is concatenated by a bit value of the DL_2 field to create a 20 bit signed number that is added to a bit value in a register specified by the B_2 field to compute the address). Then, at block 525, the servicing system 100 compares a number of counters of as requested by the servicing instruction against the number of counters in the counter set (e.g., a value in a register specified by bits 8 through 11 of R_1 field of FIG. 4). The counters, at block 530, are then stored in the computed memory address (e.g., serviced by the servicing system 100). Further, based on the comparison, the servicing system 100 sets a return code at block 535. A return code can be a value outputted by the servicing system 100, e.g., in an emulator embodiment; however, it may be used interchangeably with a condition code of a hardware embodiment as further described above.

If the access checks do not pass, then the process flow 500 proceeds (e.g., as illustrated by the 'Fail' arrow) to block 550 where instruction execution completes with an indication that the access checks did not pass (e.g., setting a return code or signaling an exception).

In view of the process flow examples described herein (e.g., 300, 400), the servicing system 100 may execute program interruption codes based upon a particular error return with the counter set, memory block, and/or number of counters. Program interruption codes cause the servicing process to exit based on the error condition. For example, the servicing system 100 may process an access exception, if the address that is specified by the instruction by the second operand is not a valid operand (e.g., if an address outside of a permitted range of memory or paged-out by the servicing system 100, then an access program interruption will be issued). The servicing system 100 may process an operation exception, if the servicing system 100 is utilizing an older piece of hardware than what is supported by the instruction (e.g., if the store-CPU-counter-multiple facility is not installed, then an operation program interruption will be issued). The servicing system 100 may process a privileged operation exception, if the instruction is executed when not in supervisor state (e.g., if an application tries to access counters and is not allowed, then a privileged program interruption will be issued). The servicing system 100 may process a specification exception, if an invalid parameter is defined by the instruction, if an invalid counter set is specified, if a counter request is to large, or if an address of the second operand is not on a doubleword boundary (e.g., if the counter set is reserved, then a specification program interruption will be issued). The servicing system 100 may process a transaction constraint exception, if the instruction is attempted to execute inside of a hardware transaction in processor (e.g., if, then a transaction constraint program interruption will be issued).

In general, computing devices may include a processor (e.g., a processor 114 of FIG. 1) and a computer readable storage medium (e.g., a memory 117 of FIG. 1), where the processor receives computer readable program instructions, e.g., from the computer readable storage medium, and executes these instructions, thereby performing one or more processes, including one or more of the processes described herein.

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computing device, partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network and/or a wireless network, comprise copper transmission cables, optical transmission fibers, wireless transmission, routers, firewalls, switches, gateway computers and/or edge servers, and utilize a plurality of communication technologies, such as radio technologies, cellular technologies, etc.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, the servicing system and method and/or elements thereof may be implemented as computer readable program instructions on one or more computing devices, stored on computer readable storage medium associated therewith. A computer program product may comprise such computer readable program instructions stored on computer readable storage medium for carrying and/or causing a processor to carry out the operations of servicing system and method. The servicing system and method and/or elements thereof, as implemented and/or claimed, improves the functioning of a computer and/or processor itself because the ability to store multiple counters with a single instruction and access check, which improves processing resource efficiency and speed.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the Figures illustrate the architecture, operability, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of implementing a servicing instruction for a plurality of counters, the method comprising:
   determining, by a processor, a counter set based on the servicing instruction;
   determining, by the processor, whether access is authorized to the counter set;
   determining, by the processor, a block of storage in a memory based on the service instruction and in response to the determining that the access is authorized;
   extracting, by the processor, the plurality of counters within the counter set in response to the determining that the access is authorized; and
   storing, by the processor, the plurality of counters in the block of storage.

2. The method of claim 1, wherein the service instruction includes a first operand identifying a requested number of counters and a second operand identifying an address of the block of storage.

3. The method of claim 1, wherein the counter set is determined by a bit field of the service instruction.

4. The method of claim 1, wherein the determining of the block of storage on a memory further comprises:
   concatenating a first bit field with a second bit field to generate a number; and
   adding the number to a contents of a register designated by a third bit field to generate an address of the block of storage in the memory.

5. The method of claim 1, further comprising:
   comparing a requested number of counters as identified by the servicing instruction against a number of counters corresponding to the counter set; and
   outputting a condition code based on the comparing.

6. The method of claim 1, further comprising:
   identifying an error condition with respect to the servicing instruction; and
   outputting an interruption to exit the method.

* * * * *